(12) United States Patent
Chu et al.

(10) Patent No.: US 9,030,520 B2
(45) Date of Patent: May 12, 2015

(54) AUTOMATIC CAMERA SELECTION FOR VIDEOCONFERENCING

(75) Inventors: Peter L. Chu, Lexington, MA (US); Jinwei Feng, Woburn, MA (US); Krishna Sai, Austin, TX (US)

(73) Assignee: Polycom, Inc., San Jose, CA (US)

( * ) Notice: Subject to any disclaimer, the term of this patent is extended or adjusted under 35 U.S.C. 154(b) by 134 days.

(21) Appl. No.: 13/163,837

(22) Filed: Jun. 20, 2011

(65) Prior Publication Data
US 2012/0320143 A1   Dec. 20, 2012

(51) Int. Cl.
*H04N 7/14* (2006.01)
*H04N 7/15* (2006.01)
*H04M 3/56* (2006.01)
*G01S 3/803* (2006.01)

(52) U.S. Cl.
CPC ............... *H04N 7/15* (2013.01); *H04M 3/567* (2013.01); *G01S 3/8036* (2013.01); *H04M 3/569* (2013.01); *H04M 2201/50* (2013.01)

(58) Field of Classification Search
USPC .......................................... 348/14.01–14.09
See application file for complete search history.

(56) References Cited

U.S. PATENT DOCUMENTS

| | | | |
|---|---|---|---|
| 5,778,082 A * | 7/1998 | Chu et al. ................... | 348/14.07 |
| 6,593,956 B1 | 7/2003 | Potts et al. | |
| 6,980,485 B2 | 12/2005 | McCaskill | |
| 7,623,156 B2 | 11/2009 | Nimri et al. | |
| 2005/0081160 A1 * | 4/2005 | Wee et al. ........................ | 725/10 |
| 2009/0015658 A1 | 1/2009 | Enstad et al. | |
| 2009/0207131 A1 | 8/2009 | Togami et al. | |

FOREIGN PATENT DOCUMENTS

| | | |
|---|---|---|
| CN | 101515197 A | 8/2009 |
| CN | 101785306 A | 7/2010 |
| JP | 2005151471 A | 6/2005 |
| JP | 2007067510 A | 3/2007 |
| JP | 2007174011 A | 7/2007 |
| JP | 2008060939 A | 3/2008 |
| JP | 2009038466 A | 2/2009 |

OTHER PUBLICATIONS

Katz, Brian F.G., et al., "Directivity Measurements of the Singing Voice." Proceedings of the 19th International Congress on Acoustics (ICA'2007), Madrid, Sep. 2-7, 2007.

(Continued)

*Primary Examiner* — Maria El-Zoobi
(74) *Attorney, Agent, or Firm* — Wong, Cabello, Lutsch, Rutherford & Brucculeri, L.L.P.

(57) ABSTRACT

In videoconference camera selection, audio inputs associated with cameras for a videoconference are each processed into first and second audio energies respectively for first and second frequency ranges. The selection then determines which of the audio inputs has a greatest ratio of the first audio energy to the second audio energy and selects the associated camera view for outputting video for the videoconference. The selection can also process video inputs from the cameras either alone or in combination with the audio processing. Either way, the selection processes each of the video inputs for at least one facial characteristic and determines which of the video inputs has a greatest likelihood of framing a human face. In the end, the selection selects the associated camera view for outputting video for the videoconference based at least in part on this video-based determination.

33 Claims, 7 Drawing Sheets

(56) References Cited

OTHER PUBLICATIONS

Harald, Jers, "Directivity Measurements of Adjacent Singers in a Choir," 19th International Congress of Acoustics, Madrid, Sep. 2007.
Chu, W.T., et al., "Detailed Directivity of Sound Fields Around Human Talkers," Institute for Research in Construction, Dec. 2002.
Kob, Malte, et al., "Directivity measurement of a singer," Published in: Collected Papers from the Joint Meeting "Berlin 99."
Notice of Grounds for Rejection in counterpart Japanese Appl. 2012-137371, mailed Aug. 13, 2013.
Decision of Grant in n counterpart Japanese Appl. 2012-137371, mailed Mar. 19, 2014.
Notice of Grounds for Rejection in counterpart Korean Appl. 10-2012-0055548, mailed Jun. 27, 2013.
Decision for Grant in counterpart Korean Appl. 10-2012-0055548, mailed Dec. 9, 2013.
First Office Action in counterpart Chinese Appl. 201210195470.9, mailed Jul. 1, 2014.

* cited by examiner

AUTOMATIC CAMERA SELECTION FOR VIDEOCONFERENCING

BACKGROUND

Figure 1A:
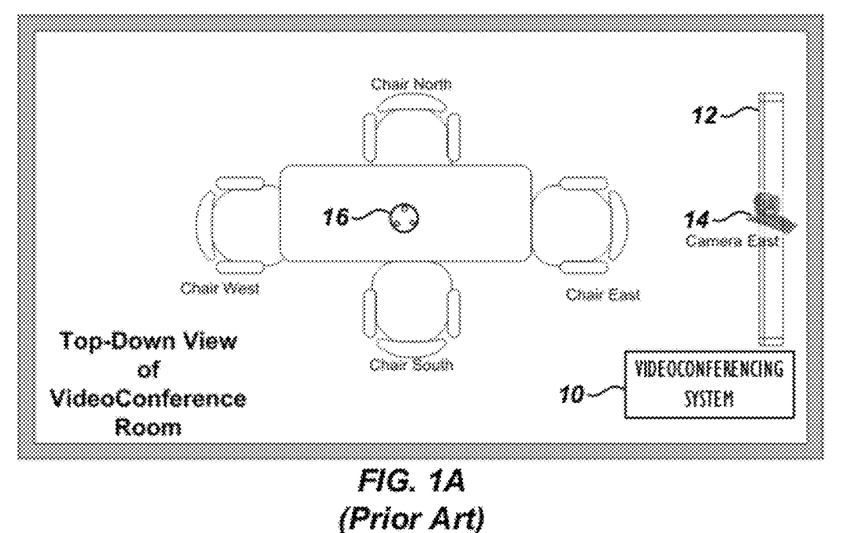
FIG. 1A shows a plan view of a videoconference room having an arrangement of a prior art videoconferencing system.

Constrained views of participants talking during a videoconference remains a continuing problem for most videoconferencing systems used in rooms or other environments. For example, FIG. 1A shows a plan view of a videoconference room with a typical arrangement. A single camera 14 mounts atop a display 12 for a videoconferencing system 10. When the video captured from this camera 14 is sent to the far-end, the view at the far-end is constrained to this camera view (i.e., camera-east). If a participant in chair-south is talking to the rest of the people in the room, then the far-end viewers will see a side profile of the talker as opposed to the more ideal frontal view. This may be the case even if the pan, tilt, and zoom of the camera 14 can be controlled. In the end, the resulting constrained view of the participant can undesirable for the viewers at the far-end.

Figure 1B:
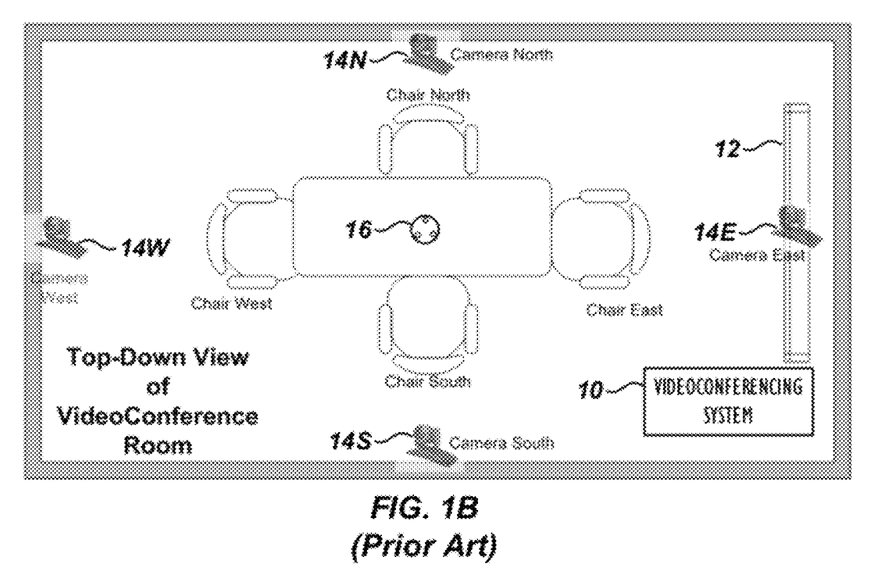
FIG. 1B shows a plan view of the videoconference room having another arrangement of a prior art videoconferencing system.

To mitigate these problems, videoconferencing systems 10 can use multiple cameras 14 in the videoconferencing environment as shown in FIG. 1B. Here, a number of cameras 14 (N, S, E, W) are positioned around the room to obtain more views of the participants. Using full-band energy received at microphones in a microphone pod 16 on the table, the system 10 can discover the direction of the participant currently speaking. To do this, the microphone in the pod 16 picking up the strongest energy can indicate the direction of a current talker. Based on this, the system 10 then chooses the camera 14 (N, S, E, W) with the view associated with that direction.

Unfortunately, energy alone is not a reliable indicator of how a person's head is turned while they are talking. For example, a participant seated in chair-south may be talking so that the direction with the greatest audio energy determined from the microphone pod 16 would indicate that the north camera 14N is the best obtain the view of the talking participant. Based on this, the videoconferencing system 10 would select the north camera 14N for outputting video.

However, the participant in chair-south may actually have his head turned toward the participant at chair-east or at the display 12 as he talks, directing his conversation in the east direction. The videoconferencing system 10 relying on the strongest microphone energy at the table would be unable to determine how the participant's head is turned. As a result, the videoconferencing system 10 would send the view of the participant's profile from the north camera 14N as he talks, even though he is facing east (toward chair-east or the display 12). Far-end viewers would then be given a less desirable view of the participant talking.

The subject matter of the present disclosure is directed to overcoming, or at least reducing the effects of, one or more of the problems set forth above.

SUMMARY

Methods, programmable storage devices, and videoconferencing apparatus are disclosed for performing automated videoconferencing techniques. The videoconference apparatus obtains audio inputs for a videoconference using an audio interface coupled to various microphones. Each of the audio inputs is associated with one of a plurality of cameras. For example, various cameras may be arbitrarily arranged around a videoconference environment, and each of the cameras can have one or more microphones associated with it by proximity.

As a threshold determination, the apparatus may first detect audio indicative of speech before processing each of the audio inputs. This can use speech detection techniques that detect acoustic energy at expected levels and in expected frequency ranges associated with human speech.

In any event, the apparatus processes each of the audio inputs into first and second audio energies respectively for first and second frequency ranges. In general, the first frequency range is greater than the second frequency range. More particularly, the first frequency range can be about 4000 Hz to about 7000 Hz, while the second frequency range can be about 500 Hz to 1000 Hz.

After determining the energies, the apparatus then determines which of the audio inputs has a greatest ratio of these different energies. Using the ratio results, the apparatus selects the camera associated with the greatest ratio for outputting video for the videoconference. Because the directivity of a person's head while speaking can be better distinguished at higher frequencies, the selected camera is more likely to have a view capable of pointing toward the face of a videoconference participant who is currently speaking.

As the videoconference progresses, the apparatus may switch between the various cameras for output depending on which participant is speaking and at which camera they are determined to be facing. This audio-based determination of the camera can be used alone or can be used in conjunction with a video based determination described below. Likewise, the video-based determination can also be used alone.

In the video based solution, the apparatus obtains video inputs with each associated with one of the cameras. From these, the apparatus processes each of the video inputs for at least one facial characteristic and determines which of the video inputs has a greatest likelihood of framing a human face. Based at least in part on this video determination, the apparatus selects the associated camera for outputting video for the videoconference. In general, the facial characteristic can include features of the human face, tone indicative of human skin, motion indicative of a human in the camera's view, and a combination thereof. When used with the audio-based determination, this video determination can further refine the resulting camera selection.

The foregoing summary is not intended to summarize each potential embodiment or every aspect of the present disclosure.

DETAILED DESCRIPTION

A. Overview of Videoconferencing System Having Multiple Cameras and Microphones

Figure 2:
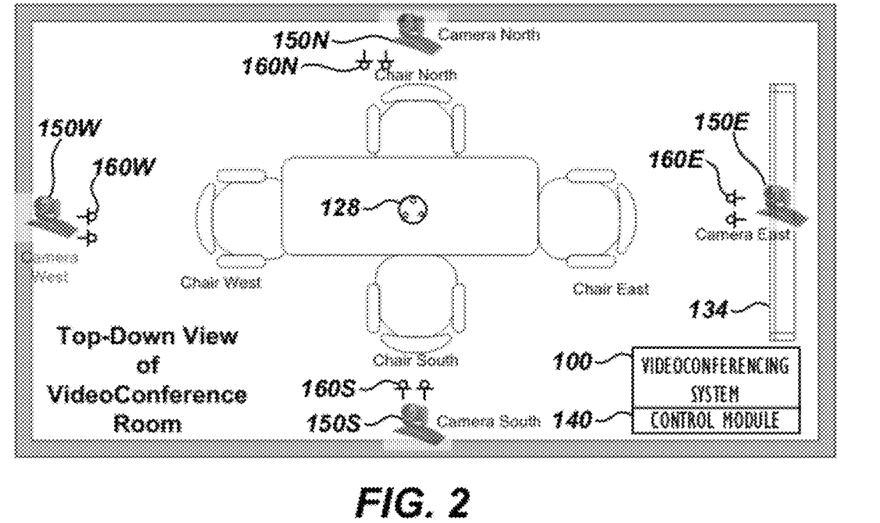
FIG. 2 shows a plan view of a videoconference room having a videoconferencing system according to the present disclosure.

FIG. 2 schematically shows a plan view of a videoconference room having a videoconferencing system 100 according to the present disclosure. The system 100 has multiple cameras 150 (N, S, E, W) disposed about the room. Although four cameras 150 (N, S, E, W) are shown, more or less could be used depending on the implementation. For instance, one controllable camera 150 may be responsible for multiple camera views.

Moreover, the cameras 150 in FIG. 2 are arranged symmetrically or in an organized way about the room. This may not always be the case because the system 100 can be set up arbitrarily with cameras 150 at multiple locations for different views, and the arrangement may change from one videoconference to the next or even as the videoconference proceeds. Therefore, it should be appreciated that the teachings of the present disclosure can apply to any of a number of arbitrary arrangements and need not apply only to an orderly, preconfigured arrangement of the videoconferencing system 100 as shown.

In general, the cameras 150 can be any suitable camera available for videoconferencing and may have fixed views or may include steerable Pan-Tilt-Zoom (PTZ) or Electronic Pan-Tilt-Zoom (EPTZ) cameras. Therefore, the videoconferencing system 100 can include features for directing the pan, tilt, and zoom of the various cameras 150 according to automated techniques know in the art. For example, a given camera 150 may be able to detect and locate an audio source and automatically perform the necessary pan, tilt, and zoom to frame that audio source.

Each of the cameras 150 has one or more microphones 160 (N, S, E, W) associated with it. These microphones 160 can be separately mounted relative to the cameras 150, or they can be integrated into the cameras 150 as desired. If integrated into the cameras 150, the associated microphones 160 can be used for detecting the direction of an audio source so the camera 150 can pan, tilt, and zoom automatically to the source using known techniques. Overall, however, the associated microphones 160 can be arbitrarily arranged in the room. Those microphones 160 in close proximity to a given camera 150 are thereby associated with the given camera 150. Such association can be preconfigured for the room, manually configured by a user of the system 100, or automatically detected by the system 100 using auto-detection techniques such as ping audio signals, infrared signals, and the like.

In addition, a microphone pod 128 can be used on the table to obtain principle audio for the videoconference. In this way, the camera-associated microphones 160 may be used for camera direction and selection as disclosed herein. Of course, the system 100 may only use the camera-associated microphones 160 for both conference audio and camera selection as disclosed herein.

During a videoconference, the camera and microphone signals pass to the videoconferencing system 100. Processing the signals, the videoconferencing system 100 then selects which camera view to output to the far-end (not shown) over a communication network. As detailed later, the camera selection depends on which participant is talking and how they are facing. Before going into how the videoconferencing system 100 determines which camera-view to select, however, some further details of the videoconferencing system 100 are shown in FIGS. 3A-3B as discussed below.

B. Details of Videoconferencing System

Figure 3A:
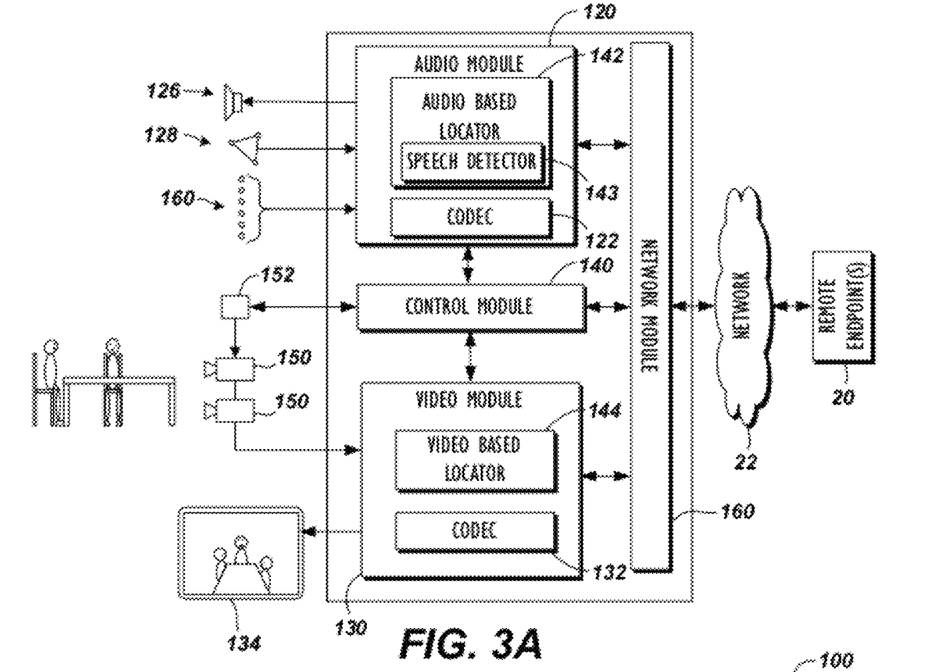
FIG. 3A illustrates a videoconferencing system according to certain teachings of the present disclosure.
Figure 3B:
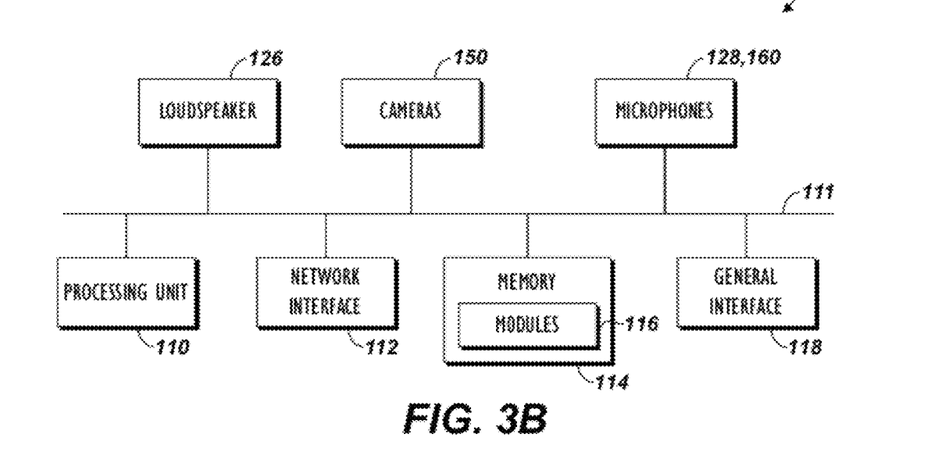
FIG. 3B illustrates components of the videoconferencing system of FIG. 3A.

As shown in FIG. 3A, the videoconferencing system 100 communicates with one or more remote endpoints 20 over a network 22. Among some common components, the system 100 has an audio module 120 with an audio codec 122 and has a video module 130 with a video codec 132. These modules 120/130 operatively couple to a control module 140 and a network module 160. The control module 140 can be a separate component or can be integrated into the system 100.

During a videoconference, the cameras 150 capture video and provide the captured video to the video module 30 and codec 32 for processing. Additionally, microphones 128/160 capture audio and provide the audio to the audio module 120 and codec 122 for processing. As noted previously, the microphone pod 128 can be placed on a table (or ceiling microphones could be used), and the system 100 may use the audio captured with the microphone pod 128 primarily for the conference audio.

Separately, microphones 160 are associated with the cameras 150 to capture audio and provide the audio to the audio module 122 for processing as noted above. For example, each camera 150 can have one or more of the microphones 160, and the associated microphones 160 can be arranged in an orthogonal array for determining locations of audio sources during the videoconference. Alternatively, the microphones 160 may be separate components from the cameras 150 but associated thereto based on proximity. In general, the system 100 can use the audio from these microphones 160 primarily for camera tracking and selection purposes and not for conference audio, although their audio could be used for the conference as well.

For camera tracking, for example, the videoconferencing system 100 can include one or more camera controllers 152 capable of processing the audio signals picked up by microphones 128/160 and the video signal generated by the cameras 150 for determining the location of a participant who is speaking during the videoconference. (The one or more controllers 152 can be separate from the cameras 150, incorporated into the camera's units, or part of the videoconferencing system 100.) In this way, the videoconferencing system 100 using automatic camera control can determine the precise location of the participant's face and can automatically "zoom in" on this location. Exemplary systems for accomplishing this are disclosed in U.S. Pat. No. 5,778,082 entitled "Method And Apparatus for Localization of an Acoustic Source," U.S. Pat. No. 6,593,956 entitled "Locating an Audio Source," and U.S. Pat. No. 6,980,485 entitled "Automatic Camera Tracking using Beamforming," which are hereby incorporated by reference in their entireties. These and other known techniques can be employed with the camera selection techniques of the present disclosure discussed below.

When audio and video has been captured, the system 100 encodes the signals using any of the common encoding standards, such as MPEG-1, MPEG-2, MPEG-4, H.261, H.263 and H.264. Then, the network module 160 outputs the encoded audio and video to the remote endpoints 20 via the network 22 using any appropriate protocol. Similarly, the network module 160 receives conference audio and video via the network 22 from the remote endpoints 20 and sends these to their respective codec 122/132 for processing. Eventually, a loudspeaker 126 outputs conference audio, and a display 134 outputs conference video. Many of these modules and other components can operate in a conventional manner well known in the art so that further details are not provided here.

In contrast to some of the conventional features, the system 100 uses the control module 140 to select output for video from the cameras 150 in an automated and coordinated manner. Generally, the system 100 outputs only video from one of the several cameras 150 at any specific time during the videoconference, and preferably the video for output captures a participant of the videoconference who is currently speaking. As the videoconference proceeds, the output video from the system 100 can then switch between views of the cameras 150 from time to time depending on which participant is speaking.

To select the view captured by the cameras 150 for output, the system 100 uses an audio-based locator 142 and a video-based locator 144 to determine locations of participants and frame views of the room and participants. Then, the control module 140 operatively coupled to the audio and video modules 120/130 uses audio and/or video information from these locators 142/144 to select the view of a camera 150 for output and/or to send camera commands to direct the cameras 150 to alter their orientations and the views they capture.

For example and as described in more detail below, the control module 140 uses audio information processed by the audio-based locator 142 from the remote microphones 160. To avoid focusing on non-speech related audio, the audio-based locator 142 may use a speech detector 143 to detect speech in captured audio from the microphones 160. The speech detection techniques can detect acoustic energy at expected levels and in expected frequency ranges associated with human speech so that noise or extraneous sounds can be ignored during the videoconference.

The control module 140 uses a determined location of the current talker from the audio-based locator 142 to switch to the best view camera 150 and/or to steer the best view camera 150 toward the current talker. As also described in more detail below, the control module 140 may use video information processed by the video-based locator 144 using video from the cameras 150 to determine the locations of participants, to determine the framing for the views, and to steer the cameras 150 at the participants' faces.

FIG. 3B shows some exemplary components for the videoconferencing system 100 of FIG. 3A. As shown and discussed above, the system 100 has two or more cameras 150 and several microphones 128/160. In addition to these, the system 100 has a processing unit 110, a network interface 112, memory 114, and a general input/output (I/O) interface 118, which are all coupled via a bus 111.

The memory 114 can be any conventional memory such as SDRAM and can store modules 116 in the form of software and firmware for controlling the system 100. In addition to video and audio codecs and other modules discussed previously, the modules 116 can include operating systems, a graphical user interface (GUI) that enables users to control the system 100, and algorithms for processing audio/video signals and controlling the cameras 150 as discussed later.

The network interface 112 provides communications between the system 100 and remote endpoints (not shown). By contrast, the general I/O interface 118 provides data transmission with local devices such as a keyboard, mouse, printer, overhead projector, display, external loudspeakers, additional cameras, microphone pods, etc. The system 100 can also contain an internal loudspeaker 126.

The cameras 150 and the microphones 160 capture video and audio, respectively, in the videoconference environment and produce video and audio signals transmitted via the bus 111 to the processing unit 110. Here, the processing unit 110 processes the video and audio using algorithms in the modules 116. For example, the processing unit 110 processes the audio captured by the microphones 128/160 as well as the video captured by the cameras 150 to determine the location of participants and direct the views of the cameras 150 as disclosed herein. Ultimately, the processed audio and video can be sent to local and remote devices coupled to interfaces 112/118.

With an understanding of the videoconferencing system 100 provided above, discussion now turns to how the videoconferencing system 100 uses audio and video-based techniques to select the best camera view to capture the participant currently speaking during a videoconference.

C. Camera Selection for Videoconferencing System

Figure 4:
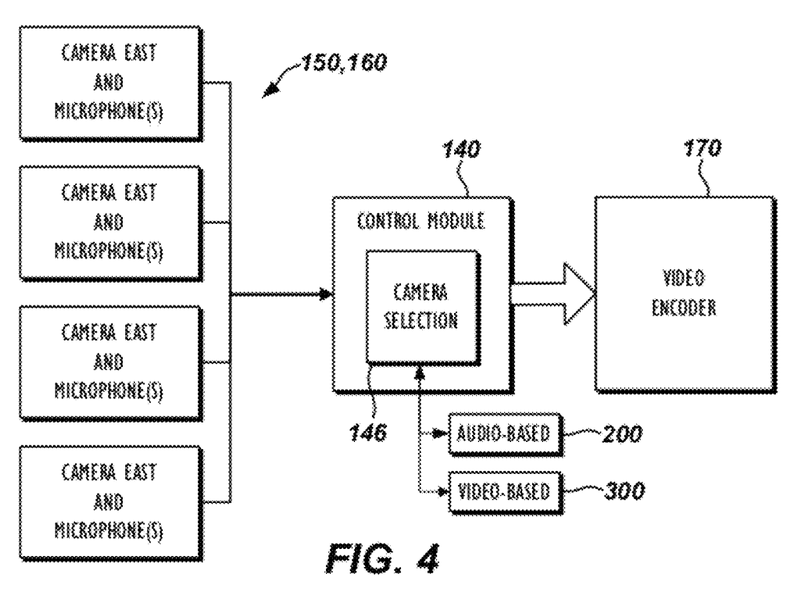
FIG. 4 schematically shows the arrangement of microphones, cameras, and control module for the disclosed videoconferencing system.

As noted previously, the camera and microphone signals during a videoconference pass to the control module 140 of the videoconferencing system 100. This is schematically illustrated in FIG. 4 based on the example arrangement of the system 100 in FIG. 2. The control module 140 switches the captured video feed for the videoconference to the camera 150 directed at the face of the current speaking participant. As a result of the selection, the control module 140 directs the captured video from the selected camera 150 to go to the system's video encoder 170 for transmission as output to the far-end.

Rather than just selecting the camera view based on which microphones have the strongest energy as conventionally done in the prior art, the control module 140 determines how the participant who is speaking may actually be facing. In this way, if a participant sitting in chair-south of FIG. 2 is speaking with his head facing the chair-east or the display (134), then the control module 140 can more appropriately select the east camera (160E) to capture video of the participant even through microphone energy detected by microphone pod (128) might indicate otherwise. To do this, the control module 140 use a camera selection process 146 of FIG. 4 to determine which camera (150) the participant is facing while speaking.

Figure 5A:
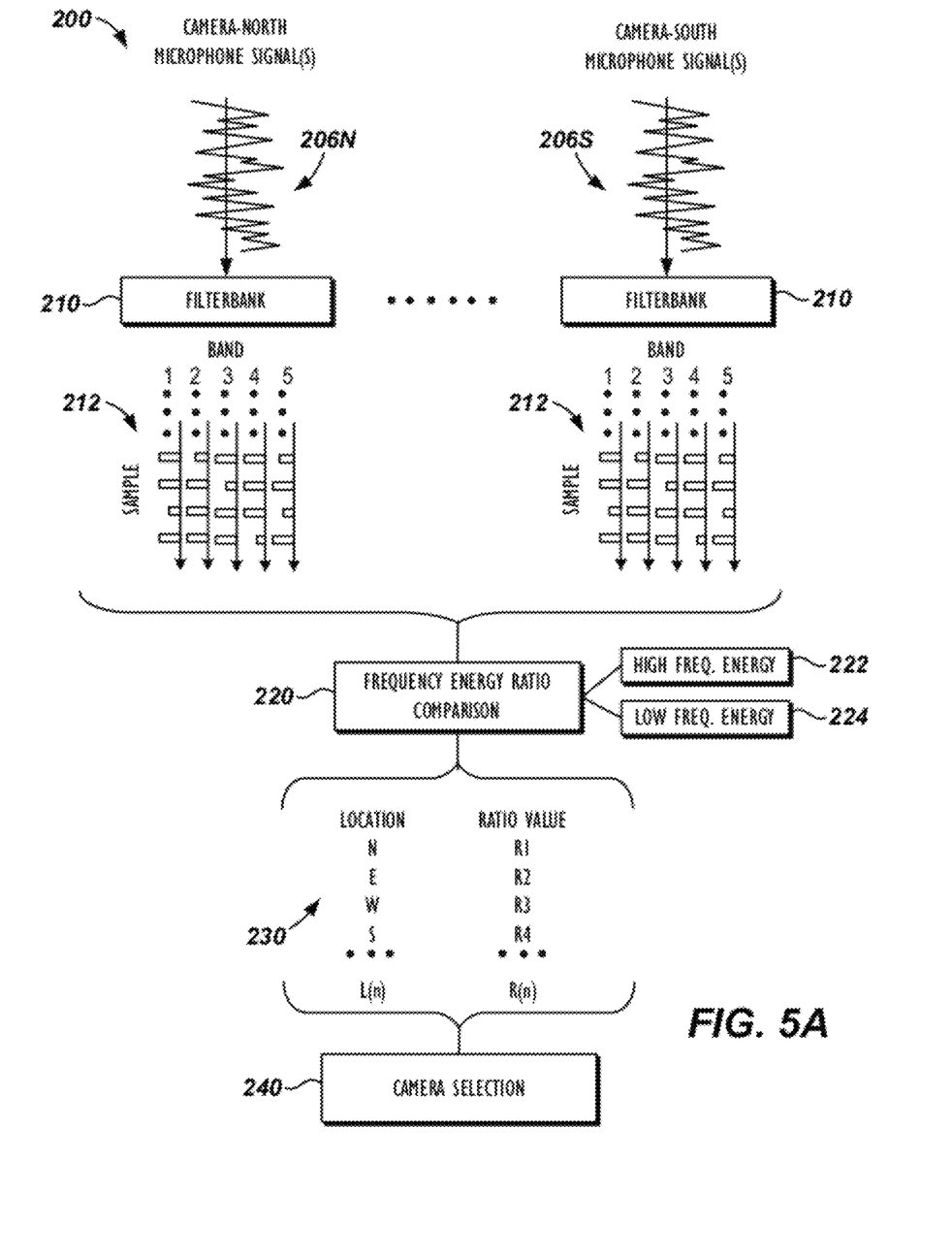
FIG. 5A schematically shows an audio-based camera selection process performed by the control module of the disclosed system.
Figure 5B:
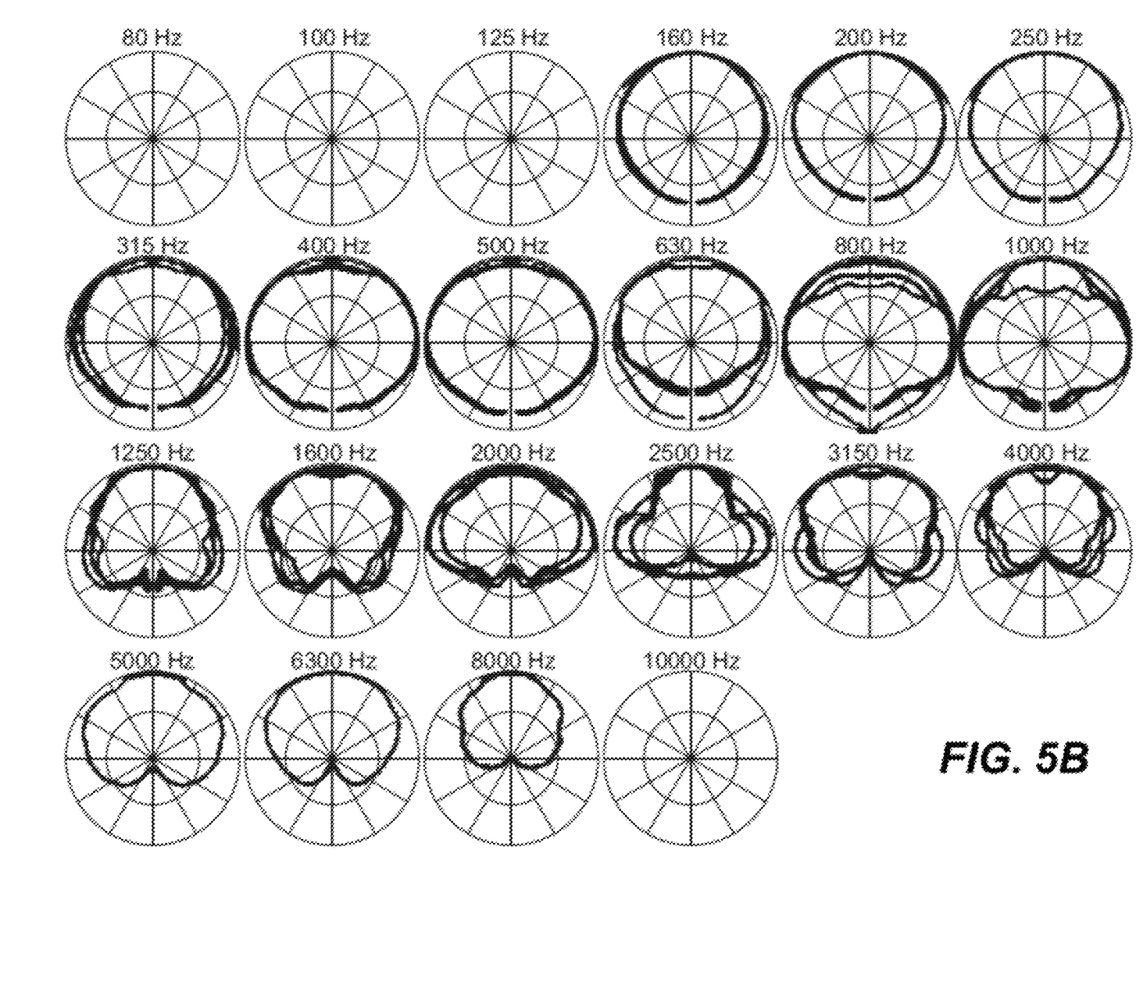
FIG. 5B illustrates how audio frequency for voice is related to directional information for a spectrum of frequencies and tones.
Figure 6:
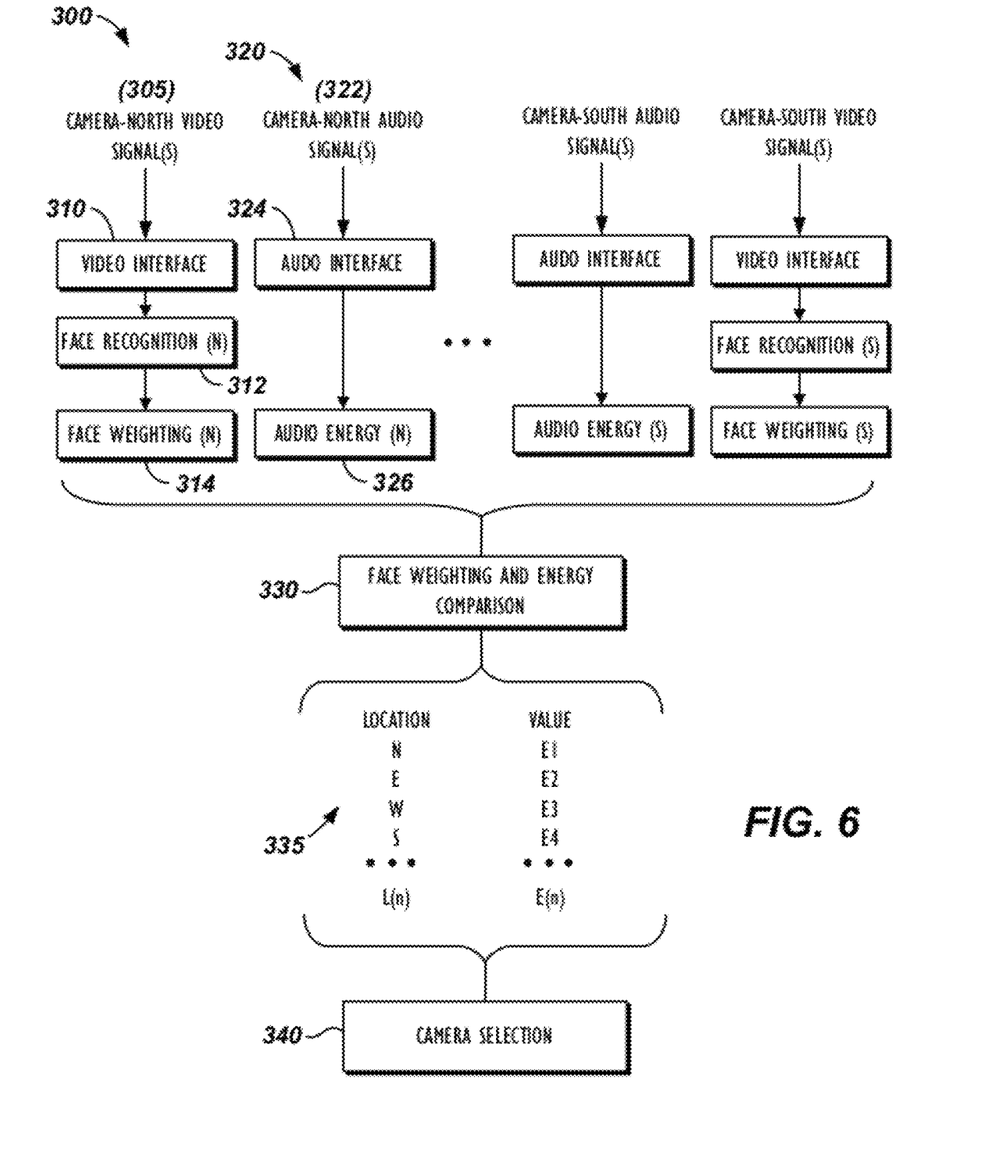
FIG. 6 schematically shows a video-based camera selection process performed by the control module of the disclosed system.

In one arrangement, the camera selection process 146 can use an audio-based process 200 that is based on the acoustical characteristics captured by the microphones (128/160) in the room to determine which camera (150) the talker is facing. FIGS. 5A-5B shows features of this audio-based process 200. As an alternative to or in conjunction with the audio-based process 200, the camera selection process 146 can uses a video-based process 300 that is based on the captured video of the various cameras (150). FIG. 6 shows features of this video-based process 300.

1. Audio-Based Selection Process

FIG. 5A schematically shows an example of the audio-based camera selection process 200 performed by the control module (140). (Reference is made to previous components and numerals for the benefit of explanation.) Audio signals 206 (N, S, E, W) from the microphones (160) associated with the various cameras (150) arrive as input to the system (100), and filterbanks 210 of the system's audio components filter each of the incoming audio signals 206 into suitable frequency bands. Any number of suitable frequency bands may be used to filter the audio signals 206, and preferably the frequency bands and their ranges facilitate the speech processing and detection purposes disclosed herein.

Audio in the various bands is sampled at suitable intervals (e.g., 20-ms is commonly used), and energy levels of the samples are calculated using techniques known in the art. Energy level signals 212 resulting from this sampling and calculation are used in later processing. The sampling and energy level calculations are done for each of the associated microphones (160) and their signals 206, which in this example include north, south, east, and west although any arrangement could apply.

At this point, the audio-based selection process 200 performs a comparison process 220 of each of the energy level signal 212 (N, S, E, W). Here, the process 220 compares each energy level signal 212 in two different frequency ranges 222/224. In this comparison, the energy in a range of high frequencies 222 for a particular signal 212 is compared to the energy in a range of low frequencies 224 for that particular signal 212. The ranges of frequencies chosen are selected to best determine which direction a speaking participant is facing as detailed below.

As shown in FIG. 5B, the direction of a human voice (and hence the direction a person is facing) is best determined at higher frequencies rather than at lower frequencies. In FIG. 5B, for example, polar plots show direction of the human voice in the horizontal plane at various frequencies and with different vocalizations. In this instance, the voice is singing with different vowel sounds, and the plots are obtained from Katz, Brian F. G. & d'Alessandro, Christophe, "Directivity Measurements of the Singing Voice." Proceedings of the 19th International Congress on Acoustics (ICA'2007), Madrid, 2-7 Sep. 2007.

As these plots generally show, the directivity of a person's head when vocalizing can best be determined at higher frequencies. At a frequency of 160 Hz, for example, the polar plot shows that the sound is generally omni-directional. By contrast, the polar plot at a frequency of 8000 Hz is considerably more directional.

Based on this correlation, the audio-based selection process 200 of FIG. 5A relates the audio frequency for the human voice captured by the microphones (160) to directional information of that participant's head. To do this, the comparison process 220 as noted previously uses a spectrum of frequencies and compares a ratio of high frequency acoustic energy 222 to low frequency acoustic energy 224 at each of the microphones (160). In general, a higher frequency range can be greater than a threshold of about 2500 Hz, while a lower frequency range can be less than that threshold.

Experimentally, however, it has been found that by taking the energy ratio of a higher frequency energy 222 from about 4000 Hz to 7000 Hz divided by a lower frequency energy 224 from about 500 Hz to 1000 Hz for the microphone(s) (160) associated with each camera (150), the camera (150) with the maximum ratio is likely to be the camera (150) towards which a speaking participant is facing. These frequency ranges have been found to be particularly suited for speech in a videoconference environment. However, the particular frequency ranges may change depending on the implementation and can vary based on how large a conference area is, how many participants might be present, how many microphones are in use, and other considerations.

Accordingly, the comparison process 220 takes the first acoustic energy 222 for the higher frequencies of about 4000 to 7000 Hz for the camera-north microphone(s) and divides this by the second acoustic energy 224 for the lower frequencies of about 500-1000 Hz for the same microphone(s) (160). In the results 230, the resulting ratio value $R_1$ is stored and associated with the corresponding camera location (i.e., camera-north). This is repeated for each of the cameras (150) and associated cameras (160). In the end, the process 200 makes a selection 240 of the camera (150) having the highest ratio R in the results 230, as this camera (150) is most likely the one currently facing the talking participant.

Returning to FIG. 2, now that the camera 150 has been selected, the control module 140 directs operation of the system 100 so that captured video from this selected camera 150 becomes part of the output for the far-end. Of course, the control module 140 can provide a delay before switching, can verify the result, and perform other common function to avoid spurious or frequent switching between camera views. Likewise, the automatic camera control process described previously can control the pan, tilt, and zoom of the selected camera (160) to best frame the participant. Overall, the switching between camera views is intended to be well timed and natural and to avoid frequent changes in views and the like.

2. Video-Based Selection Process

As an alternative to or in conjunction with the acoustic arrangement discussed above, the control module 140 can uses the video-based selection process 300 based on the captured video of the various cameras. Turning now to FIG. 6, details of this video-based selection process 300 are shown.

In this process 300, video signals 305 from each the various cameras (160) (e.g., N, S, E, W) come as inputs to a video interface 310. In turn, the interface 310 performs video processing for face recognition 312 on the input video signals 305. This video processing can use motion detection, skin tone detection, face detection, and other algorithms to process the video signals 305 in a way indicative of whether the captured video includes a human face or not.

For example, the video processing can use facial recognition techniques to detect and locate faces in the camera's view. To do this, the video processing can find faces by finding regions that are likely to contain human skin tones, and then from these, regions that indicate the location of a face in view. Details related to skin tone and facial detection (as well as audio locating) are disclosed in U.S. Pat. No. 6,593,956 entitled "Locating an Audio Source," which has been incorporated herein by reference.

Additionally, the video processing for the face recognition 312 can use a face detection or face-finding algorithm to increase the tracking accuracy by confirming that the current camera view does indeed frame a view having a human face. The face detection can detect frontal face views and may be able to detect left and right profile views of the face. One available algorithm for video face detection is OpenCV (Open Source Computer Vision), which is a library of programming functions for real time computer vision. Any of a number of other algorithms available in the art can also be used, although OpenCV for face detection is preferred.

Using this facial detection process, the camera (150) being faced by the speaking participant will have the highest confidence score of a frontal face detector. Face detection can be useful because it may work best when determining a captured view of a frontal face. Other orientations of the face may be detected less reliably so that the face detection can be used as a threshold measurement of the captured camera view being processed.

Further, the video processing for the face recognition 312 can detect skin tones in the video signal 305 using techniques known in the art and can perform a motion detection algorithm on video captured from the cameras (150) to check for motion in the current view. As an example of these techniques, the image of a face is detected by identifying a region that has skin tone colors in the frames of video captured by the cameras (150). Briefly, the video processing can take an average of chrominance values within a frame or a portion of a frame. If the average is within a range associated with skin tones, then the frame or portion thereof is deemed to have a skin tone characteristic. This video captured by the cameras (150) may also represent a moving face as determined, for example, by comparing the frame of video with a previous frame of video to determine changes due to motion in the video (presumably resulting from a participant's movement).

Using one or more of these video processing techniques for face recognition 312, the process 300 calculates a face weighting 314 for the associated camera (150). This face weighting 314 can be calculated in any number of ways depending on how results of the processing are obtained. Thus, thresholds, confidence levels, comparisons, averages, or the like can be used to determine the weightings 314.

The process 300 then performs a comparison 330 using these face weightings 314 to find the camera (150) with the highest likelihood of framing the face of the current speaker in the comparison's results 335. In the end, camera selection 340 can be made at least in part based on these comparison results.

Although the video-based selection process 300 can be based entirely on video, more than one camera (150) may be framing a participant's face, and face recognition 312 alone may not be able to determine if that person is currently talking. Therefore, audio-based processing 320 can be included in the process 300 of FIG. 6 as an addition to the video-based selection. As such, audio 322 can be input into an audio interface 324, and processing according to disclosed techniques can determine an audio energy 326 for the input audio, which can then be used in the comparison 330. The audio-based processing 320 can use any of the various techniques described herein for determining which participant is speaking in the conference and which way that participant is facing. This can include conventional beam-forming techniques or the frequency energy ratio comparison (220) of FIG. 5A.

As one example, the captured energy at the microphone pod (128), such as on the table, may indicate which person is speaking and this information can be incorporated along with the video processing into the comparison 330 to refine the results 335 for the camera selection 340. Therefore, video processing for the face recognition 312 may give the north camera 150N and the east camera 150E in FIG. 2 with high face weightings as they potentially frame participants at chair west and chair south. If this is the case, the audio processing using audio from the microphone pod 128 may indicate that the participant at chair south is currently talking. Thus, the system 100 can select the north camera 150N.

Alternatively, if the audio processing using audio from the microphone pod 128 indicates that the participant at chair south is currently talking, face recognition weightings 314 between the cameras (150) may indicate that the participant at chair south is facing the east camera (150E) as opposed to other cameras. This may be the case because the face weighting for video from this east camera (150E) may indicate a higher likelihood that the participant is directed at this camera (150E) as opposed to the others.

As noted previously, the captured energy at the microphone pod (128) and beam-forming may not be a reliable indicator of which way a current talker is facing. Therefore, the audio-based processing 320 in FIG. 6 can use the camera-associated microphones (160) as noted herein and can look at the ratio of high frequencies to low frequencies according to the audio-based processing discussed in FIGS. 5A-5B. In turn, the audio processing 320 in FIG. 6 can then be added to the video processing (e.g., using face detection or the like as discussed herein) in the comparison 330 to provide another layer for finding which camera the person is currently facing while talking.

In the end, the captured energy at the camera-associated microphone(s) (160) may indicate which person is speaking and this information can be incorporated along with the video processing into the comparison 330 to refine the results 335 for the camera selection 340. For example, the audio processing using audio from the camera-associated microphones (160) may indicate that the participant at chair south in FIG. 2 is currently facing at either the north camera (150N), east camera (150E), or some point in between because the audio-based determination is not definitive. In this case, video processing for the face recognition 312 may give the north camera (150N) with a higher face weighting 314 than the east camera (150E). If this is the case, the system 100 selects the north camera (150N) for outputting video of the current talker at chair south because that participant is most likely facing the north camera (150N).

D. Additional Arrangement of Videoconferencing System Having Multiple Cameras and Microphones As discussed above with reference to FIG. 2, the arrangement of cameras 150 and microphones 160 has been rather orderly and symmetrical. As noted previously, this may not always be the case, and the videoconferencing system 100 can be arranged arbitrarily in a conferencing environment. Nevertheless, the camera selection techniques disclosed herein can be particularly beneficial in such arbitrary arrangements.

Figure 7:
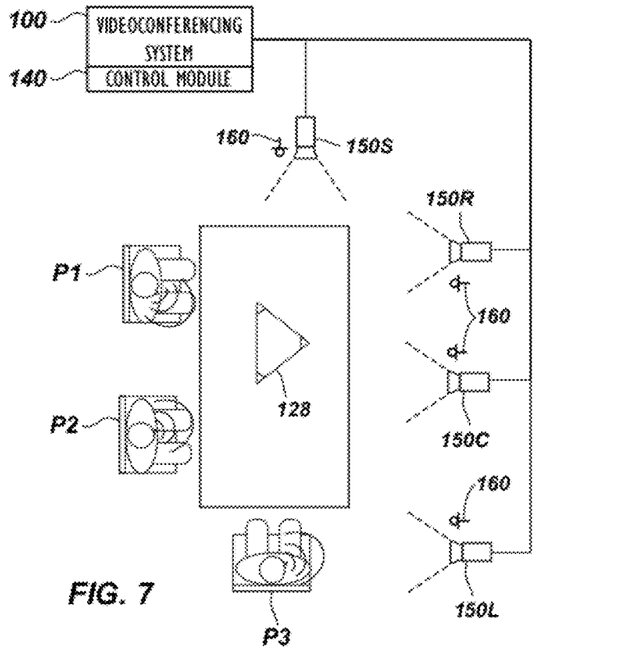
FIG. 7 shows another schematic arrangement of cameras and microphones relative to participants and a microphone pod to help describe the camera selection techniques in more detail.

For example, FIG. 7 shows another schematic arrangement of the system 100 having cameras 150 and microphones 160 arranged relative to participants and a microphone pod 128. This example arrangement will help describe the disclosed camera selection techniques in more detail because the various cameras 150 are not arranged symmetrical around the room, table, and participants. Thus, one of the front cameras 150 (R, C, L) or even the side camera 150S may best capture and frame a participant who is speaking even though another one of the cameras 150 may be in front of, closer to, or generally facing that participant. Using the audio and/or video based processing disclosed herein, however, the videoconferencing system 100 and control module 140 can provide finer camera selection in this and other comparable arrangements.

In one brief example, participant P3 may be speaking. Regular beam-forming techniques using the microphone pod 128 may indicate that this is the case by indicating the direction of the speaking participant P3 relative to the pod 128. (For example, details related to automatic camera tracking using beam-forming can be found in U.S. Pat. No. 6,980,485, which has been incorporated herein by reference in its entirety.) Such camera tracking techniques could be used to frame the participant P3 with a view from the side camera 150S. Yet, the participant P3 may be speaking with her head turned, which would make framing by another camera more appropriate to capture the participant's face.

Using the associated microphones 160, the control module 140 can make a camera selection based on the audio processing techniques disclosed herein to determine which of the cameras 150 the speaking participant P3 is currently facing. In this example, that particular camera may be camera 150L, which could then be used to output video for the videoconference.

Figure 8A:
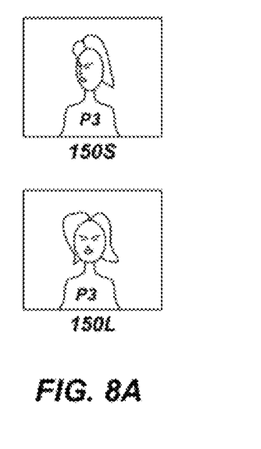
FIGS. 8A-8B show example camera views of participants in the arrangement of FIG. 7.

For example, FIG. 8A shows views from cameras 150S/150L. The first view from camera 150S shows the participant P3 with her head slightly turned while speaking, while the second view from camera 150L shows a more frontal view of the participant's face while speaking. The disclosed audio-based processing techniques can help indicate that the participant P3 is likely facing the left camera 150L so that the system 100 can select its view to output video of the videoconference. Once selected, the view of the camera 150L can be further directed to point at and frame the participant P3 using known techniques. Of course, the video-based selection techniques can also be used as discussed herein.

In another brief example, participant P1 may be speaking. Regular beam-forming techniques using the microphone pod 128 may indicate that this is the case, indicating the direction of the speaking participant P1 relative to the pod 128. This could be used to frame the participant P1 with a view from any of the front cameras 150 (R, C, L). Yet, the participant P1 may be speaking with his head turned, which would make framing by a particular camera more appropriate to capture the participant's face.

Using the associated microphones 160, the control module 140 can therefore make a camera selection based on the audio processing techniques disclosed herein to determine which of the cameras 150 the speaking participant P1 is currently facing. In this example, that particular camera may be camera 150L, which could then be used to output video for the videoconference.

Figure 8B:
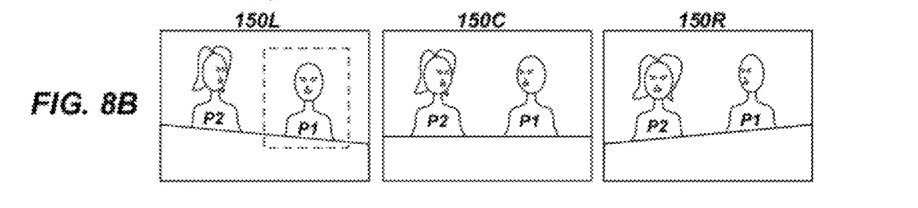

For example, FIG. 8B shows views from cameras 150L/150C/150R. The first view from left camera 150L shows the participant P1 with his head facing the camera 150L, the second view from the center camera 150C shows the participant P1's face slightly turned, and the third view from the right camera 150R shows the participant P1's face turned more. The audio-based processing techniques can help indicate that the participant P1 is likely facing the left camera 150L so that the system 100 can select it to output video of the videoconference. Once selected, the view of the camera 150L could be further directed to point at and frame the participant P1 using known techniques.

However, if the directivity of the participant P1's head is not unequivocally distinguishable to definitively select one of these cameras 150 (R, C, L), then the video-based processing techniques disclosed herein may be used to further refine the determination. In particular, the facial recognition techniques disclosed herein may indicate that one camera (i.e., 150L) is more likely capturing a frontal view of the participant's face than the other cameras (i.e., 150 R, C), which are capturing partial profiles of the participant's face. In the end, this additional determination can better indicate which camera 150L to use to output captured video of the speaking participant P1.

E. Camera Module Having Audio/Video Processing Capabilities

Figure 9A:
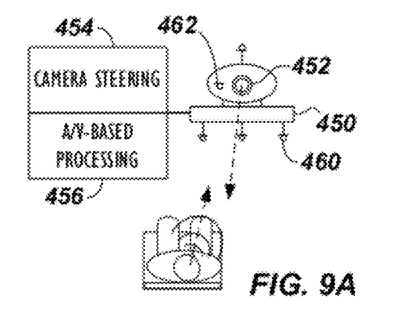
FIG. 9A shows a camera module having a camera, microphones, and camera steering and processing components.

In previous arrangements, the videoconferencing system 100 has had multiple cameras and microphones and has used the audio and video-based processing techniques disclosed herein to select which camera to use for output. Although useable on a wide scale for multiple cameras and microphones, the disclosed techniques can be used in a more discrete manner with individual camera modules, which may be part of a wider videoconferencing system. For example, FIG. 9A shows a camera module 450 having a controllable camera 450 and an array of microphones 460. The module 450 has camera steering components 454 and audio/video processing components 456, which may be either integrated into or separate from the module 450. Such components 454/456 can be handled by processing units of a wider videoconferencing system or can be handled locally by the module 450.

During operation, the camera steering components 454 can use audio input from the array of microphones 460 to steer the camera 452 to a participant who is speaking. This can use many of the techniques directed to beam-steering with a microphone array, such as disclosed in incorporated U.S. Pat. No. 6,593,956. In addition to such techniques, the module 450 uses the audio-visual processing techniques disclosed herein to refine the steering of the camera 452 toward the speaking participant.

In particular, the A/V-based processing components 456 use the audio-based processing disclosed above that measures the ratio of energies for different frequency ranges to determine the directionality of the participant head. For example, audio from one of the microphones 460 on the module can be filtered and sampled. First energy levels for a high frequency range (e.g., 4000 Hz to 7000 Hz) can be determined and correlated to the directivity of the participant's head while speaking.

Alternatively, audio from more than one of the microphones 460 can be processed for the first energy level as well as for second energy levels for a lower frequency range (e.g., 500 Hz to 1000 Hz). The microphone 460 having the greatest ratio of the first energy level divided by the second energy level can then indicate at which microphone 460 the participant's head is most likely directed while speaking.

Finally, as opposed to the fixed microphones 460 in the array, the camera module 450 can include a microphone 462 that moves with the camera 452. As the camera steering components 454 steer the camera 452 toward the speaking participant, audio from this moving microphone 462 can be filtered and sampled to determine the ratio of first and second energy levels for the high and low frequency ranges. As the camera 452 and microphone 462 move, the processing components 456 can determine when the ratio reaches a maximum or highest level before dropping off. The position of the camera 452 at such a point would indicate that the camera 452 is best aligned with the direction of the participant's head while speaking.

Figure 9B:
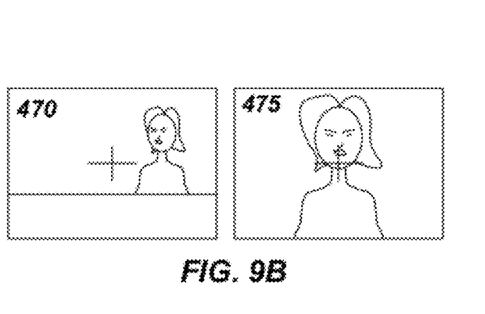
FIG. 9B shows captured views from the camera module in FIG. 9A.

To help illustrate the refined steering, FIG. 9B shows captured views from the camera module 450 in FIG. 9A during camera steering and processing. As shown in the view 470, the camera module 450 may be capturing a view of the participant while speaking. However, the participant's head may be turned or directed slightly away from the direction of the camera's view angle. Using the audio-based processing described above, the camera module 450 can further steer the camera 452 and determine the directionality of the participant's head so that its view angle better aligns therewith. This can result in a more refined view 475 as also shown in FIG. 9B.

In addition to the audio-based techniques, the video-based techniques as disclosed herein can also be employed to better direct the camera 452 at the face of the participant and to "zoom in" and better from the participant while speaking. This can use many of the techniques disclosed in incorporated U.S. Pat. No. 6,593,956, for example, as well has the facial recognition techniques disclosed previously.

F. Conclusion

As can be seen above, the audio-based and video-based camera selection techniques disclosed herein can be used alone or in combination with one another to determine which camera to use to output video of a speaking participant so as to best capture that participant's face. With the benefit of the present disclosure, one skilled in the art can see how these techniques can be used with any possible arrangement of cameras 150, microphones 160/128, participants, seating arrangements, etc.

Various changes in the details of the illustrated operational methods are possible without departing from the scope of the following claims. For instance, illustrative flow chart steps or process steps may perform the identified steps in an order different from those disclosed herein. Alternatively, some embodiments may combine the activities described herein as being separate steps. Similarly, one or more of the described steps may be omitted, depending upon the specific operational environment in which the method is being implemented.

In addition, acts in accordance with flow chart or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A videoconference camera selection method, comprising:
    obtaining a plurality of audio inputs for a videoconference, each of the audio inputs associated with one of a plurality of camera views;
    processing each of the audio inputs into first audio energy for a first frequency range and into second audio energy for a second frequency range, the first frequency range being higher than the second frequency range;
    determining which of the audio inputs has a greatest ratio of the first audio energy relative to the second audio energy;
    selecting the camera view associated with the audio input having the greatest ratio; and
    outputting video of the selected camera view for the videoconference.

2. The method of claim 1, wherein the first frequency range is greater than a threshold of about 2500 Hz, and wherein the second frequency range is less than the threshold.

3. The method of claim 1, wherein processing each of the audio inputs into the first audio energy for the first frequency range comprises using the first frequency range of about 4000 Hz to about 7000 Hz.

4. The method of claim 3, wherein processing each of the audio inputs into the second audio energy of the second frequency range comprises using the second frequency range of about 500 Hz to about 1000 Hz.

5. The method of claim 1, further comprising detecting audio indicative of speech as a prerequisite to processing each of the audio inputs.

6. The method of claim 1, wherein selecting the associated camera view comprises switching for output from one of the camera views to another of the camera views.

7. The method of claim 1, further comprising adjusting one or more of a pan, a tilt, and a zoom of the selected camera view.

8. The method of claim 1, further comprising:
    obtaining a plurality of video inputs, each of the video inputs associated with one of the camera views;
    processing each of the video inputs for at least one facial characteristic; and
    determining which of the video inputs has a greatest likelihood of framing a human face based on the processing,
    wherein selecting the camera view is based at least in part on the camera view associated with the video input having the greatest likelihood.

9. The method of claim 8, wherein the at least one facial characteristic is selected from the group consisting of a human facial feature, a tone indicative of human skin, a motion indicative of a human, and a combination thereof.

10. The method of claim 1, wherein the camera views are associated with a plurality of arbitrarily arranged cameras.

11. The method of claim 10, wherein each of the audio inputs comprise one or more microphones associated by proximity to at least one of the cameras.

12. The method of claim 1, wherein the camera views are associated with at least one controllable camera.

13. A program storage device having program instructions stored thereon for causing a programmable control device to perform a videoconference camera selection method, the method comprising:
    obtaining a plurality of audio inputs for a videoconference, each of the audio inputs associated with one of a plurality of camera views;
    processing each of the audio inputs into first audio energy for a first frequency range and into second audio energy for a second frequency range, the first frequency range being higher than the second frequency range;
    determining which of the audio inputs has a greatest ratio of the first audio energy relative to the second audio energy;
    selecting the camera view associated with the audio input having the greatest ratio; and
    outputting video of the selected camera view for the videoconference.

14. A videoconferencing apparatus, comprising:
    a video interface receiving video inputs of a plurality of camera views;
    an audio interface receiving audio inputs, each of the audio inputs associated with one of the camera views;
    a network interface communicatively coupling to a network; and
    a processing unit operatively coupled to the video, audio, and network interfaces, the processing unit programmed to:
        process each of the audio inputs into a first audio energy for a first frequency range and into a second audio energy for a second frequency range, the first frequency range being higher than the second frequency range, determine which of the audio inputs has a greatest ratio of the first audio energy relative to the second audio energy,
select the camera view associated the audio input having the greatest ratio, and
output the video input of the selected camera view with the network interface.

15. The apparatus of claim 14,
wherein the processing unit is programmed to:
process each of the video inputs for at least one facial characteristic, and
determine which of the video inputs has a greatest likelihood of framing a human face based on the processing; and
wherein the selection of the camera view is based at least in part on the camera view associated with the video input having the greatest likelihood.

16. The apparatus of claim 14, further comprising a plurality of arbitrarily arranged cameras communicatively coupled to the video interface and each associated with one of the camera views.

17. The method of claim 16, further comprising a plurality of microphones communicatively coupled to the audio interface and each associated by proximity to at least one of the arbitrarily arranged cameras.

18. A videoconferencing apparatus, comprising:
at least one controllable camera for obtaining video with a directed view;
at least one microphone for obtaining audio; and
a processing unit operatively coupled to the at least one controllable camera and the at least one microphone, the processing unit programmed to:
process the audio from the at least one microphone into a first audio energy for a first frequency range and into a second audio energy for a second frequency range, the first frequency range being greater than the second frequency range,
determine a ratio of the first audio energy to the second audio energy, and
control the directed view of the at least one controllable camera based on the determined ratio.

19. The program storage device of claim 13, wherein the first frequency range is greater than a threshold of about 2500 Hz, and wherein the second frequency range is less than the threshold.

20. The program storage device of claim 13, wherein processing each of the audio inputs into the first audio energy for the first frequency range comprises using the first frequency range of about 4000 Hz to about 7000 Hz.

21. The program storage device of claim 20, wherein processing each of the audio inputs into the second audio energy of the second frequency range comprises using the second frequency range of about 500 Hz to about 1000 Hz.

22. The program storage device of claim 13, further comprising detecting audio indicative of speech as a prerequisite to processing each of the audio inputs.

23. The program storage device of claim 13, wherein selecting the associated camera view comprises switching for output from one of the camera views to another of the camera views.

24. The program storage device of claim 13, further comprising adjusting one or more of a pan, a tilt, and a zoom of the selected camera view.

25. The program storage device of claim 13, further comprising:
obtaining a plurality of video inputs, each of the video inputs associated with one of the camera views;
processing each of the video inputs for at least one facial characteristic; and
determining which of the video inputs has a greatest likelihood of framing a human face based on the processing,
wherein selecting the camera view is based at least in part on the camera view associated with the video input having the greatest likelihood.

26. The program storage device of claim 25, wherein the at least one facial characteristic is selected from the group consisting of a human facial feature, a tone indicative of human skin, a motion indicative of a human, and a combination thereof.

27. The apparatus of claim 14, wherein the first frequency range is greater than a threshold of about 2500 Hz, and wherein the second frequency range is less than the threshold.

28. The apparatus of claim 14, wherein to process each of the audio inputs into the first audio energy for the first frequency range, the processing unit is programmed to use the first frequency range of about 4000 Hz to about 7000 Hz.

29. The apparatus of claim 27, wherein to process each of the audio inputs into the second audio energy of the second frequency range, the processing unit is programmed to use the second frequency range of about 500 Hz to about 1000 Hz.

30. The apparatus of claim 14, wherein the processing unit is further programmed to detect audio indicative of speech as a prerequisite to processing each of the audio inputs.

31. The apparatus of claim 14, wherein to select the associated camera view, the processing unit is programmed to switch for output from one of the camera views to another of the camera views.

32. The apparatus of claim 14, wherein the processing unit is further programmed to adjust one or more of a pan, a tilt, and a zoom of the selected camera view.

33. The apparatus of claim 14, wherein the at least one facial characteristic is selected from the group consisting of a human facial feature, a tone indicative of human skin, a motion indicative of a human, and a combination thereof.

* * * * *